US006922809B2

(12) United States Patent
Coden et al.

(10) Patent No.: US 6,922,809 B2
(45) Date of Patent: Jul. 26, 2005

(54) METHOD AND APPARATUS PROVIDING CAPITALIZATION RECOVERY FOR TEXT

(75) Inventors: Anni Rosa Coden, Bronx, NY (US); Eric William Brown, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 09/893,158

(22) Filed: Jun. 27, 2001

(65) Prior Publication Data

US 2002/0099744 A1 Jul. 25, 2002

Related U.S. Application Data

(60) Provisional application No. 60/263,959, filed on Jan. 25, 2001.

(51) Int. Cl.[7] ................................................. G06F 7/02
(52) U.S. Cl. ....................... 715/531; 715/532; 715/538; 704/251
(58) Field of Search ................................ 715/531, 532, 715/538; 704/251

(56) References Cited

U.S. PATENT DOCUMENTS 5,761,689 A * 6/1998 Rayson et al. .............. 715/533
6,012,088 A * 1/2000 Li et al. ...................... 709/219

OTHER PUBLICATIONS

David C. Gibbon, 'Automated Authoring of Hypermedia Documents of Video Program', ACM Multimedia 1995, Electronic Proceedings, pp. 1–12.*
"A Parser for Real–Time Speech Synthesis of Conversational Texts" Bachenko et al., AT &T Bell Laboratories, date unknown, pp. 25–32.

"Automated Authoriing of Hypermedia Documents of Video Programs" Shahraray et al., ACM Multimedia 95—Electronic Proceedings, Nov. 5–9 1995, 12 pages.

* cited by examiner

Primary Examiner—Stephen Hong
(74) Attorney, Agent, or Firm—Ohland, Greeley, Ruggiero & Perle, L.L.P.; Satheesh K. Karra

(57) ABSTRACT

A method for capitalizing text in a document includes processing a reference corpus to construct a plurality of dictionaries of capitalized terms, where the plurality of dictionaries include a singleton dictionary and a phrase dictionary. Each record in the singleton dictionary contains a word in lowercase, a range of phrase lengths m:n for capitalized phrases that the word begins, where m is a minimum phrase length and n is a maximum phrase length, and where each record in the phrase dictionary includes a multi-word phrase in lowercase. The method adds proper capitalization to an input monocase document by capitalizing words found in mandatory capitalization positions; and by looking up each word in the singleton dictionary and, if the word is found in the singleton dictionary, testing the corresponding phrase length range. If the phrase length range indicates that the word does not start a multi-word phrase, the method capitalizes the word, while if the phrase length range indicates that the word does start a multi-word phrase, the method tests the word and an indicated plurality of next words as a candidate phrase to determine if the candidate phrase is found in the phrase dictionary and, if it is, capitalizes the words of the multi-word phrase. If the candidate phrase is not found in the phrase dictionary, the method changes the number of words in the candidate phrase (e.g., decrements by one) to form a revised candidate phrase, and determines whether the revised candidate phrase is found in the phrase dictionary.

17 Claims, 10 Drawing Sheets

DICTIONARY BUILD PROCESS

METHOD AND APPARATUS PROVIDING CAPITALIZATION RECOVERY FOR TEXT

CLAIM OF PRIORITY TO A COPENDING PROVISIONAL PATENT APPLICATION

This patent application claims priority under 35 U.S.C. 119(e) from Provisional Patent Application No.: 60/263,959, filed Jan. 25, 2001, the content of which is incorporated by reference herein in its entirety.

TECHNICAL FIELD

These teachings relate generally to text and document processors, to algorithms and systems that provide properly capitalized text for a document.

BACKGROUND

Proper capitalization in text is a useful and often mandatory characteristic. Many text processing techniques rely on the text being properly capitalized, and many people can more easily read mixed-case text than monocase text (i.e., all lowercase or all uppercase). However, proper capitalization is often missing from many text sources, including automatic speech recognition output and closed captioned text. As may be appreciated, the value of these sources of text can be greatly enhanced when properly capitalized.

The presence of proper and correct capitalization is also becoming important due to the wide-spread use of Named Entity recognizers in various types of automatic document processing systems. Named Entity recognizers typically require proper capitalization in a document corpus for correct operation. However, some corpi, such as closed caption transcripts, are written in monocase.

Proper capitalization in text is often taken for granted. Most documents, such as newspaper articles, technical papers and most web pages are properly capitalized. Capitalization makes text easier to read and provides useful clues about the semantics of the text. Many text analysis systems exploit these semantic clues to perform various text processing tasks, such as indexing, parsing, sentence boundary disambiguation, extraction of named entities (e.g., people, places, and organizations) and to provide identification of relationships between named entities.

There are several text sources, without proper capitalization, that have experienced wider-spread use. Two of these sources are closed caption text from television broadcasts and the output from automatic speech recognition (ASR) systems. Closed caption text is an extremely valuable source of information about a television broadcast, essentially enabling the application of text analysis and indexing techniques on the audio/video television program. Closed caption text, however, is typically all upper case, which seriously impedes the effectiveness of many text analysis procedures. Moreover, all upper case text is more difficult to read when displayed on a computer monitor or television screen, or when printed on paper.

Automatic speech recognition has matured to the point where researchers and developers are applying ASR technology in a wide variety of applications, including general video indexing and analysis, broadcast news analysis, topic detection and tracking, and meeting capture and analysis. Although dictation systems built with ASR provide limited capitalization based on dictated punctuation and a lexicon of proper names, the more interesting application of ASR is in the area of speaker independent continuous dictation, which can be used to create a text transcript from any audio speech source. Systems that support this task typically provide a SNOR (Speech Normalized Orthographic Representation) output, which is in an all upper case format.

The ability to recover capitalization in case-deficient text, therefore, is quite valuable and worthy of investigation. Restoring proper capitalization to closed caption text and ASR output not only improves its readability, it also enables the use of a number of text processing tasks as mentioned previously. Even in those domains where capitalization is normally given, a system that recovers proper capitalization can be used to validate that the correct case has been used. Although capitalization rules exist, most are in fact merely conventions.

The recovery of capitalization from a source text has traditionally been rarely considered as a topic by itself. It is briefly discussed by Shahraray and Gibbon, "Automated Authoring of Hypermedia Documents of Video Programs," Proc. of the Third ACM International Conf. on Multimedia, San Francisco, 1995, who describe a system that automatically summarizes video programs into hypermedia documents. Their approach relies on the closed caption text from the video, which must be properly capitalized. They describe a series of text processing steps based on Bachenko et al., J. Bachenko, J. Daugherty, and E. Fitzpatrick, "A Parser for Real-Time Speech Synthesis of Conversational Texts," Proc. of the Third ACL Conf. on Applied Natural Language Processing, pp. 25–32, Trento, Italy, 1992, that includes rules for capitalizing the start of sentences and abbreviations, a list of words that are always capitalized, and a statistical analysis based on training data for deciding how the rest of the words should be capitalized.

In those applications where the proper case is normally expected but not available, a typical approach is to modify the program that relies on the existence of the proper case so that proper case is no longer required to complete the task. An example of such a task is Named Entity extraction on ASR output, a task that appears in DARPA sponsored Broadcast News workshops. One system that has performed especially well under these circumstances is Nymble (also known as IdentiFinder). Reference in this regard can be made to D. Bikel, S. Miller, R. Schwartz, and R. Weischedel, "Nymble: a High-Performance Learning Name-finder," Proc. of the Fifth ACL Conf. on Applied Natural Language Processing, Washington, D.C., 1997, and to F. Kubala, R. Schwartz, R. Stone, and R. Weischedel, "Named Entity Extraction from Speech," Proc. of the 1998 DARPA Broadcast News Transcription and Understanding Workshop, 1998.

Nymble is based on a Hidden Markov Model, which must be trained with labeled text. When the training data is converted to monocase, Nymble performs nearly as well on monocase test data as in a mixed case scenario.

Problems that exist with these conventional approaches to dealing with case-deficient text include a requirement to modify applications to support case-deficient text, or providing alternate training sets for every capitalization situation. Both of these approaches are less than desirable.

SUMMARY

The foregoing and other problems are overcome by methods and apparatus in accordance with embodiments of these teachings.

These teachings provide a system and method that apply uniform capitalization rules to a corpus. This capability is useful in any system involving text input from humans, such as word processors, email systems, instant messaging systems, and Telecommunications Devices for the Deaf (TDD's). ASR systems and closed caption systems also benefit from the application of these teachings.

The system and method recover capitalization in case-deficient text through a series of processing steps that include the application of heuristics, statistical analysis and dictionary lookup. Experiments have shown that the system and method are capable of recovering more than 88% of the capitalized words from a corpus with better than 90% accuracy.

The system and method enables developers to apply an original text analysis application on any text. Moreover, correctly capitalized text can benefit applications other than named entity extraction, such as parsing, sentence boundary disambiguation, indexing, and the general readability of the text.

These teachings assume the existence of a comparable reference corpus of properly capitalized documents. The reference corpus is processed to build dictionaries of capitalized terms by running a Named Entity recognizer to extract proper names, terms, abbreviations, acronyms and various capitalized noun phrases. The resulting list of capitalized entities is filtered to eliminate infrequently occurring items, and those items with a high likelihood of being erroneous. The list is then processed to build a singleton dictionary and a phrase dictionary. Each record in the singleton dictionary contains a term in lowercase, a range of phrase lengths m:n for capitalized phrases that the term begins, where m is the minimum phrase length and n is the maximum phrase length., and an optional final form for the term if there is an unusual capitalization (i.e., other than an initial uppercase letter followed by lowercase.) Each record in the phrase dictionary contains a phrase in lowercase and an optional final form for the phrase if the phrase has unusual capitalization (i.e., other than an initial uppercase letter followed by lowercase for every term (word) in the phrase.)

All single word entities are added to the singleton dictionary with a phrase length range of 1:1, indicating that the term does not begin any phrase, and should be capitalized by itself. Multi-word entities are added to the phrase dictionary, and the first word of the phrase is added to the singleton dictionary with a phrase length range of n:n, where n is the number of words in the phrase. If the first word already exists in the singleton dictionary, the phrase length range entry for the term is updated to ensure that the length of the current phrase is included in the phrase length range.

Proper capitalization is added to an input monocase document as follows. Those words in mandatory capitalization positions (e.g., words starting a sentence, titles, abbreviations) are capitalized after they are identified. Each word is then looked up in the singleton dictionary. If the word is found in the singleton dictionary, the corresponding phrase length range is then checked. If the phrase length range is 1:1, the word is capitalized and the next word is then checked. If the maximum phase length n is greater than one, the next n−1 words in the document are added to the current word to create a candidate phrase with a phrase length n, and the resulting candidate phrase is looked up in the phrase dictionary. If the candidate phrase is found in the phrase dictionary, the phrase is capitalized in the document in the indicated manner, and processing then continues in the document with the next word following the phrase. If the candidate phrase is not found in the phrase dictionary, a candidate phrase length of n−1 is considered in the same fashion, and all candidate phrase lengths down to length m are considered in turn until either a match is found, or the loop completes without locating the candidate phrase in the phrase dictionary. The entire input document or body of text is processed in this manner to obtain a properly capitalized corpus.

This processing may be enhanced by using a stop words list, and only considering non-stop words for capitalization or as phrase head words.

The ability to automatically construct the capitalization dictionaries for properly capitalized text enables the capitalization recovery system to be kept current with little human effort.

BRIEF DESCRIPTION OF THE DRAWINGS

The above set forth and other features of these teachings are made more apparent in the ensuing Detailed Description of the Preferred Embodiments when read in conjunction with the attached Drawings, wherein.

DETAILED DESCRIPTION OF THE PREFERRED EMBODIMENTS

Figure 1:
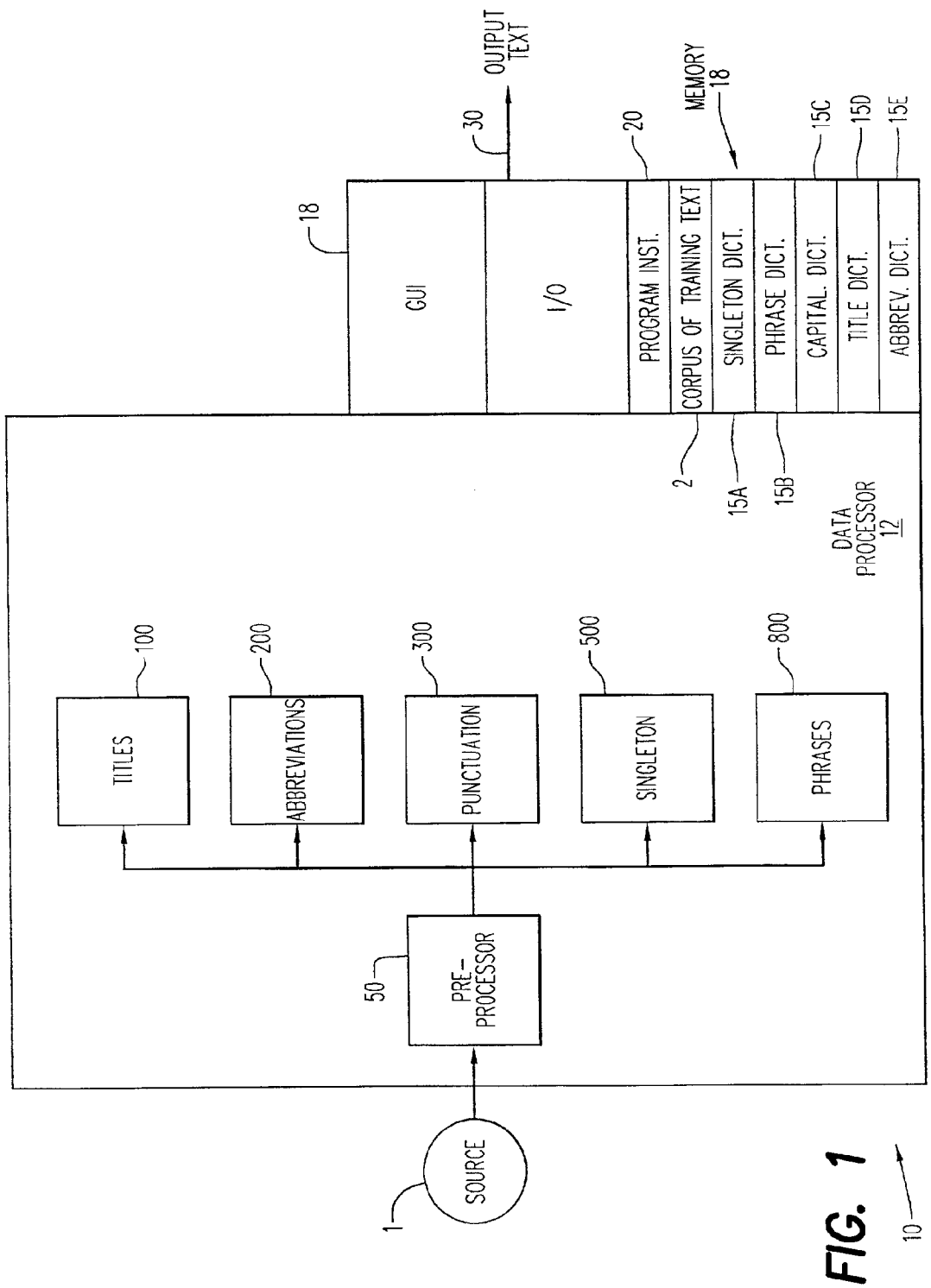
FIG. 1 is a simplified block diagram of a capitalization system that is embodied for executing a method in accordance with these teachings.

Reference is first made to FIG. 1 for showing an overall block diagram of a capitalization recovery system 10 in accordance with these teachings. The capitalization recovery system 10 assumes the presence of a source 1 of characters descriptive of text to be capitalized. The source 1 may represent the output of an ASR system, a close captioned system, manual user input, or any suitable generator or repository of textual data. The output of the source 1 is connected to a preprocessor 50, described in FIG. 2, which outputs preprocessed character data to the other component parts and subsystems of the capitalization recovery system 10. These subsystems include a title processing subsystem 100, an abbreviations processing subsystem 200, a punctuation processing subsystem 300, a singles or singleton processing subsystem 500 and a phrase processing subsystem 800.

It should be realized that the capitalization recovery system 10 may be embodied as a stand alone computer (e.g., as a personal computer or a mainframe computer), or as an embedded computer such as a microprocessor contained or embedded within, for example, a communications device, a text entry system or an ASR system. The computer embodiment includes at least one data processor 12, a memory 14, input/output channels and devices 16 and possibly a graphical user interface (GUI) 18 for interacting with a user. In this case the operation of the capitalization recovery system 10 is controlled by program instructions or software 20 that is resident in a portion of the memory 14, or in some other memory or memory media (e.g., a fixed or removable disk or tape) that is accessible by the data processor 12. The output 30 of the capitalization recovery system 10 is textual data that has been correctly capitalized. The output 30 may be used directly, such as by printing or by transmission electronically to another location, or it may serve as the input to another system or systems, such as a Named Entity recognizer.

The memory 14 is operated so as to contain all or a portion of a corpus of training text 2, various dictionaries, such as a singles or singleton dictionary 15A (see FIG. 10), a phrase dictionary 15B (see FIG. 11), a capitalization dictionary 15C, a title dictionary 15D and an abbreviations dictionary 15E, various lists and other data constructions that are employed during the operation of the capitalization recovery system 10, as described in greater detail below.

The overall approach to restoring correct capitalization in text in accordance with these teachings is based on several assumptions about the text. First, the input text from the source 1 is assumed to have punctuation, e.g., sentence ending periods, question marks, and exclamation marks, as well as periods after abbreviations. Second, there is assumed to be the training corpus 2 of text with correct punctuation and capitalization, and this corpus is related to the input text from source 1 (the text in which capitalization is to be restored). For example, if the input text is closed caption text from a television news broadcast, a suitable training corpus would include newspaper articles from the same time period as the television program. However, these assumptions may be relaxed, as discussed below.

The foregoing assumptions are suggestive of a number of processing steps that can be applied individually or in combination by the capitalization system 10 and method. First, the system 10 assumes that the initial word in a document begins a new sentence and should be capitalized. Next, the system 10 considers punctuation marks. All question marks and exclamation points are treated as sentence boundaries by the system 10, and the next word following one of these punctuation marks is always capitalized.

Periods appearing in the text require additional processing. A period may mark the end of a sentence, the end of an abbreviation, or both. For the purposes of restoring proper capitalization, however, the system 10 is not required to distinguish between these cases. Many abbreviations are almost always followed by a capitalized word, namely titles (e.g., Mr., Dr., etc.) and middle initials in proper names. In these cases, the system 10 may treat the period as if it marked the end of a sentence, and capitalize the next word following the period.

The task, then, is to identify abbreviations where the following word is not normally capitalized. This is accomplished through the use of the abbreviations dictionary 15E, the titles dictionary 15D, and some amount of heuristic processing. The abbreviations dictionary 15E is generated automatically from the training corpus 2 in two steps. First, all words that end with a period at least 75% of the time, and that precede a lower case word at least half of those times, are added to the abbreviations dictionary 15E, where a word is any token separated by white space containing at least one letter. Second, all words from the singleton dictionary 15A (see FIG. 10) that end with a period are added to the abbreviations dictionary 15E. In one experiment this procedure was found to produce an abbreviations dictionary 15E containing 156 abbreviations from 92MB of training text. The key for each entry in the abbreviations dictionary 15E is the lowercase version of the abbreviation (with periods), and the value is the properly capitalized form of the abbreviation, e.g.:

| Key | Value |
|-----|-------|
| u.s. | U.S. |
| jan. | Jan. |

The titles dictionary 15D (or simply a titles list) may be a manually generated list of common titles, including Dr., Gov., Mr., Mrs., Ms., Pres., Prof., Rep., Rev., and Sgt. Clearly other titles could be added to this list. Which titles to include depends on the domain of the text being processed.

The heuristic processing involves three rules for identifying additional abbreviations that don't appear in the abbreviations dictionary 15E or the titles dictionary 15D. First, if the word is a single letter followed by a period, the word is assumed to be a middle initial. Second, if the word matches the regular expression "[a–z]\. {2, }" (single letter followed by a period, repeated two or more times), the capitalization recovery system 10 assumes the word is an abbreviation (acronym). Third, if the word consists entirely of consonants followed by a period, the capitalization recovery system 10 assumes the word is an abbreviation.

Using these resources, the capitalization recovery system 10 processes words that end in a period using the following algorithm:

if the word is a title then it and the following word are capitalized else if the word matches the first abbreviation rule then the word (single letter) is uppercased and the following word is capitalized else if the word is found in the abbreviations dictionary 15E then the value from the corresponding entry is substituted for the word and the following word is not capitalized else if the word matches the second abbreviation rule then all of the letters in the word are capitalized and the following word is not capitalized else if the word matches the third abbreviation rule then the following word is not capitalized else the period indicates the end of a sentence and the following word is capitalized After processing punctuation, the capitalization recovery system 10 applies one additional capitalization heuristic unrelated to abbreviations. All forms of the pronoun T (i.e., I, I've, I'm, I'd, I'll) are always capitalized.

Applying the techniques described thus far has been found to recover more than 36% of the capitalized words with better than 99% accuracy. In order to increase the coverage, the capitalization recovery system 10 uses more than just the punctuation cues provided in the text being capitalized.

The first technique considered to increase the number of correctly capitalized words is the use of a capitalization frequency dictionary constructed from the training corpus 2. For each word in the training text that consists entirely of letters, the capitalization dictionary 15C stores the number of times the word occurs in each of the following forms:
1. all lower case (l)
2. capitalized (c)
3. all upper case (u)
4. at the start of a sentence (m)

Items 1 through 3 can be collected in a straightforward manner from the training corpus 2. Unless the corpus has been annotated with sentence boundaries, item 4 is collected instead by estimating sentence boundaries. This is preferably accomplished by applying the same punctuation, title, and abbreviation processing described above.

The capitalization dictionary 15C allows the capitalization recovery system 10 to estimate the probability that any given word should be capitalized. The probability that word should be capitalized is estimated as:

$$p(C_i) \times (C_i - m_i + u_i) / (l_i + c_i - m_i + u_i),$$

where l, c, u, m are counts of the number of times each word in training text occurs lowercased (l), capitalized (c), all uppercase (u), and in a mandatory capitalization position (m).

As each word in the test text is processed, if it does not match any of the punctuation, abbreviation, or title rules, the capitalization recovery system 10 calculates the word's capitalization probability using the capitalization dictionary 15C. If this probability exceeds a specified threshold (e.g., 0.5), then the word is capitalized. Using the capitalization dictionary 15C, the capitalization recovery system 10 was found in one experiment to be able to recover an additional 43% of the capitalized words, or 79% total, with an accuracy over 93%.

Since the capitalization dictionary 15C contains information about most known common words, it may be safe to assume that any word (consisting entirely of letters) that does not appear in the capitalization dictionary 15C is most likely a named entity and should be capitalized. Adding this assumption to the processing brings the total coverage up to 82% with an accuracy of over 92%.

At this point, the majority of the missed words that still require capitalization are words that can act as both common words and proper names, e.g., 'brown', which can be both a color and a surname. Proper capitalization of these words depends on the context in which they occur. The preferred approach to adding context processing to the capitalization recovery system 10 is to create the phrase dictionary 15B from the training corpus 2, and to incorporate the phrase dictionary 15B into the capitalization processing.

In that a goal is to enable named entity extraction in case-deficient text using a Named Entity recognizer that relies on case, the same named entity recognizer may be used to create the phrase dictionary. The presently preferred Named Entity recognizer is one known as Textract (see IBM Intelligent Miner for Text, "http://www-4.ibm.com/software/data/iminer/fortext/" and Y. Ravin, N. Wacholder and M. Choi, "Disambiguation of Names in Text," Proc. of the Fifth ACL Conf on Applied Natural Language Processing, pp. 202–208, Washington D.C., 1997.) Textract operates to identify proper names, places, organizations, abbreviations, dates, and a number of other vocabulary items in text. Textract also aggregates variant lexical forms of the same concept and identifies a canonical form for the concept. For example, Textract might identify the canonical form "President George Washington" and associate with that form the variants "President Washington," "George Washington," and "Washington." The output from Textract is a vocabulary file containing a record for each identified concept that gives the canonical form, its variants, and frequency statistics for how often the concept occurs in the collection.

Figure 10:
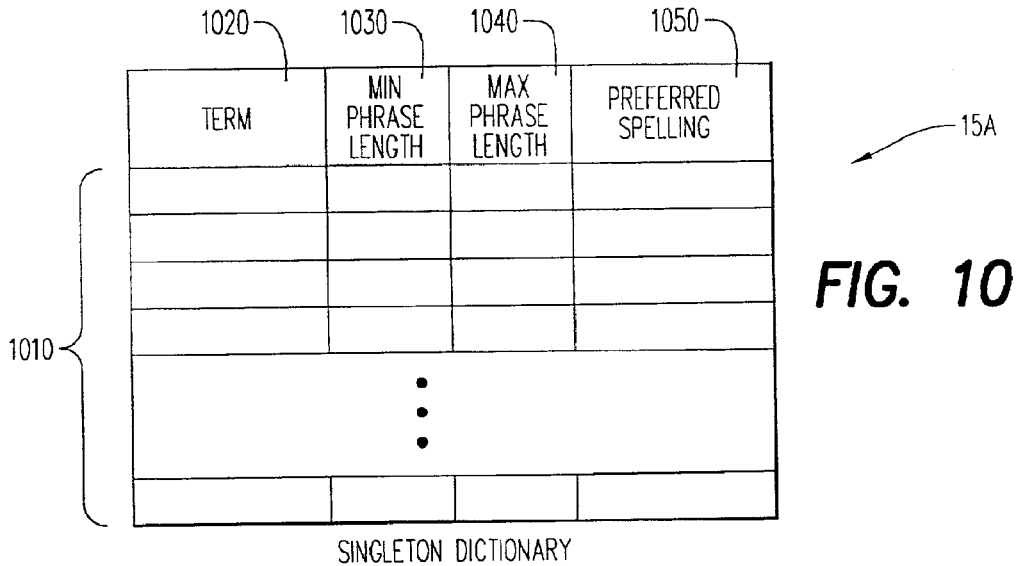
FIG. 10 depicts a preferred construction of a singleton dictionary.
Figure 11:
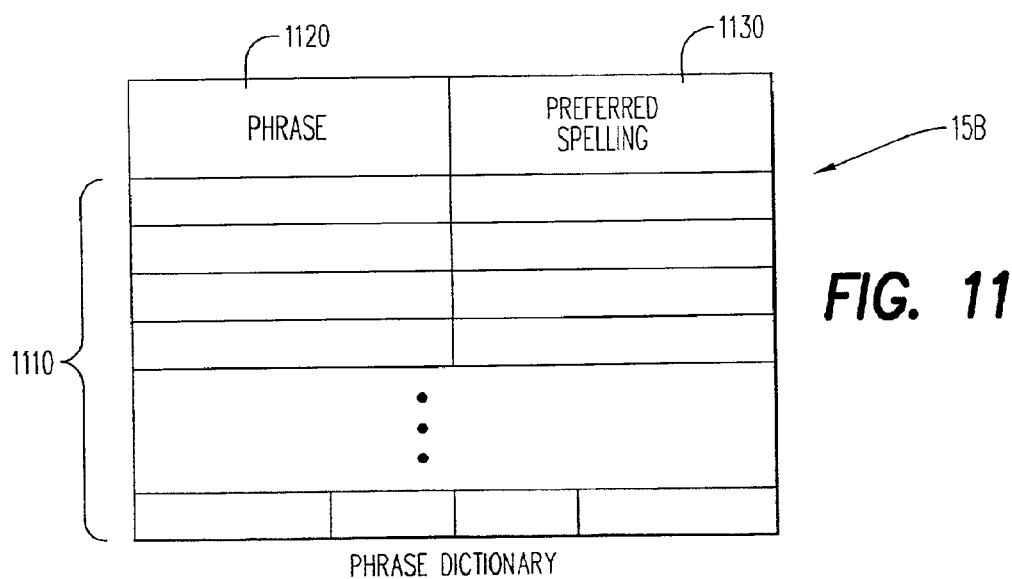
FIG. 11 depicts a preferred construction of a phrase dictionary.

After Textract has processed the training data, the resulting vocabulary file is filtered to generate the singleton or singles dictionary 15A (see FIG. 10) and the phrases dictionary 15B (see FIG. 11). For every concept that occurs in at least three documents, all of the multi-word variants (including the canonical form) with capitalized words are added to the phrase dictionary 15B and the first word in each phrase is added to the singles dictionary 15A as a phrase head. For each single word variant, if its capitalization probability (according to the capitalization dictionary 15C described earlier) is greater than 0.5, then it is added to the singles dictionary 15A as a singleton. The entry for a phrase head in the singles dictionary 15A includes the lengths of the shortest and longest known phrases started by the word. Singletons and phrases with unusual capitalization (where "usual" capitalization means only the first letter in each word is capitalized) have preferred capitalization forms stored in their respective dictionaries.

The capitalization recovery system 10 uses these dictionaries as follows. For each word that does not match any of the punctuation, abbreviation, or title rules, the capitalization recovery system 10 looks up the word in the singles dictionary 15A. If the word is a phrase head, n–1 additional words are parsed from the input text (where n is the length of the longest known phrase started by the current word) and the phrase is used to probe the phrase dictionary 15B. If the phrase is not found, it is shortened from the end one word at a time until it is either found or the capitalization recovery system 10 determines that the phrase is not in the phrase dictionary 15B. When a phrase is found in the phrase dictionary 15B, every word in the phrase is capitalized and processing continues with the next word after the phrase.

If the initial probe of the singles dictionary 15A reveals that the current word is a singleton and not a phrase head, then the word is capitalized. In either case, if the capitalization recovery system 10 finds a preferred capitalization form in the singles dictionary 15A or the phrase dictionary 15B, the capitalization recovery system 10 uses that form rather than the usual capitalization.

The set of singletons in the singles dictionary 15A is similar to the set of words in the capitalization dictionary 15C, with capitalization probabilities greater than 0.5. The differences are that the singletons in the singles dictionary are initially selected by the Textract Named Entity extraction process, the singletons may contain punctuation (e.g., hyphens or periods), and the singletons may have preferred unusual capitalization forms.

For a final processing variant, the capitalization recovery system 10 may combine the singles and phrases dictionary processing with the capitalization dictionary 15C processing. If a word is not found in the singles dictionary, the capitalization recovery system 10 probes the capitalization dictionary 15C with the word. If it is found, the word is capitalized if its capitalization probability exceeds the probability threshold. If it is not found, and if the word consists entirely of letters, it is assumed to be a proper name that does not appear in the training data, and the word is capitalized.

Having thus provided an overview of the processing performed by the capitalization recovery system 10, a more detailed description is now provided.

Figure 2:
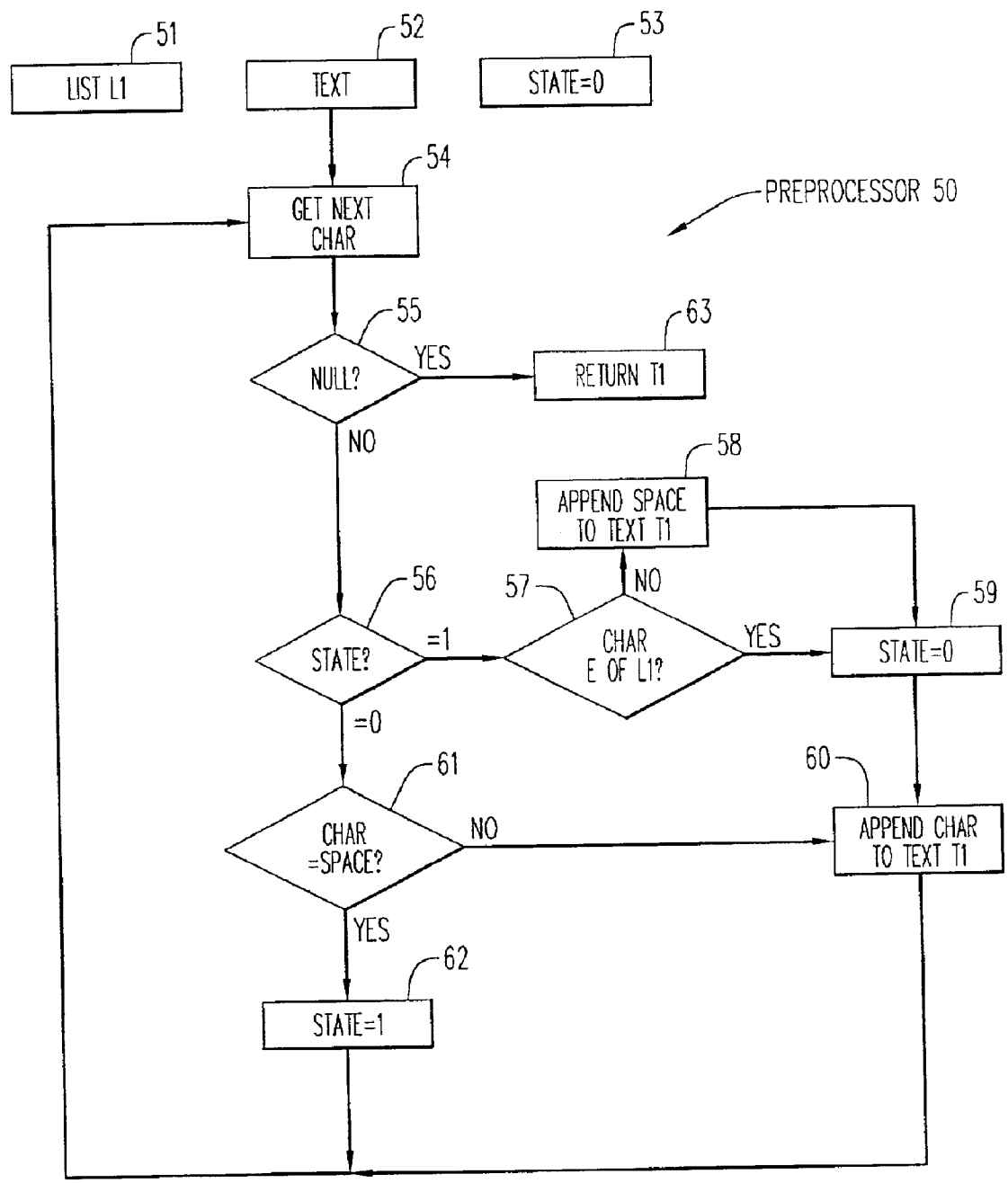
FIG. 2 is a logic flow diagram of the operation of the preprocessor unit of FIG. 1.

Referring to FIG. 2, the input is the text from the source 1 which is to be automatically capitalized. A word is defined to be any sequence of characters between the current position and the next space. To be able to use this definition of word appropriately, punctuation should be part of the word it annotates. For example, there should be no space between an opening double quote and the following word. To assure that the text conforms to this, it is first processed by the preprocessor 50, which is shown in FIG. 2.

There are three inputs to the preprocessor 50 as depicted in boxes 51, 52 and 53. Box 52 is the original text from which the appropriate spaces are to be removed, and the processed text T1 is returned at the end in box 63. The list L1 shown in box 51 is a list of punctuation marks which should be following a word without spaces. This list may include '''',..!( )[]? but is dependent, in general, on the language. For English, the list contains all characters which are neither a letter or a number. One preferred embodiment of the preprocessor 50 is a finite state machine, and the state is initialized to 0 in box 53. Depicted in box 54 is the loop through the text, one character at a time. In box 55 it is checked whether the next character is null, meaning that the end of the input text was reached. In that case, the processed text T1 is returned in box 63. If the character is not null, the value of the state is tested in box 56. Depending on the value different paths in the flowchart are followed. In the case where the state is 1 it is tested whether the current character is a space in box 61. In the case where the character is a space, the value of the state is changed to 1 in box 62 and the preprocessor 50 continues to get the next character in box 54. If the character is not a space (as tested in box 61), it is appended to the text T1 in box 60 and again the preprocessor 50 continues to get the next character in box 54. Returning to the description of box 56, in the case where the value of the state is 1, it is tested in box 57 whether the current character is a member of the list L1. If it is not, a space (which is actually the previous character) is added to the text T1 in box 58. In both cases (whether the current character is a member of the list L1 or not, the preprocessor 50 continues at box 59 and set the state to 0 before proceeding to box 60, where the current character is added to text T1. After finishing this task, the next character is examined in box 54.

Figure 3:
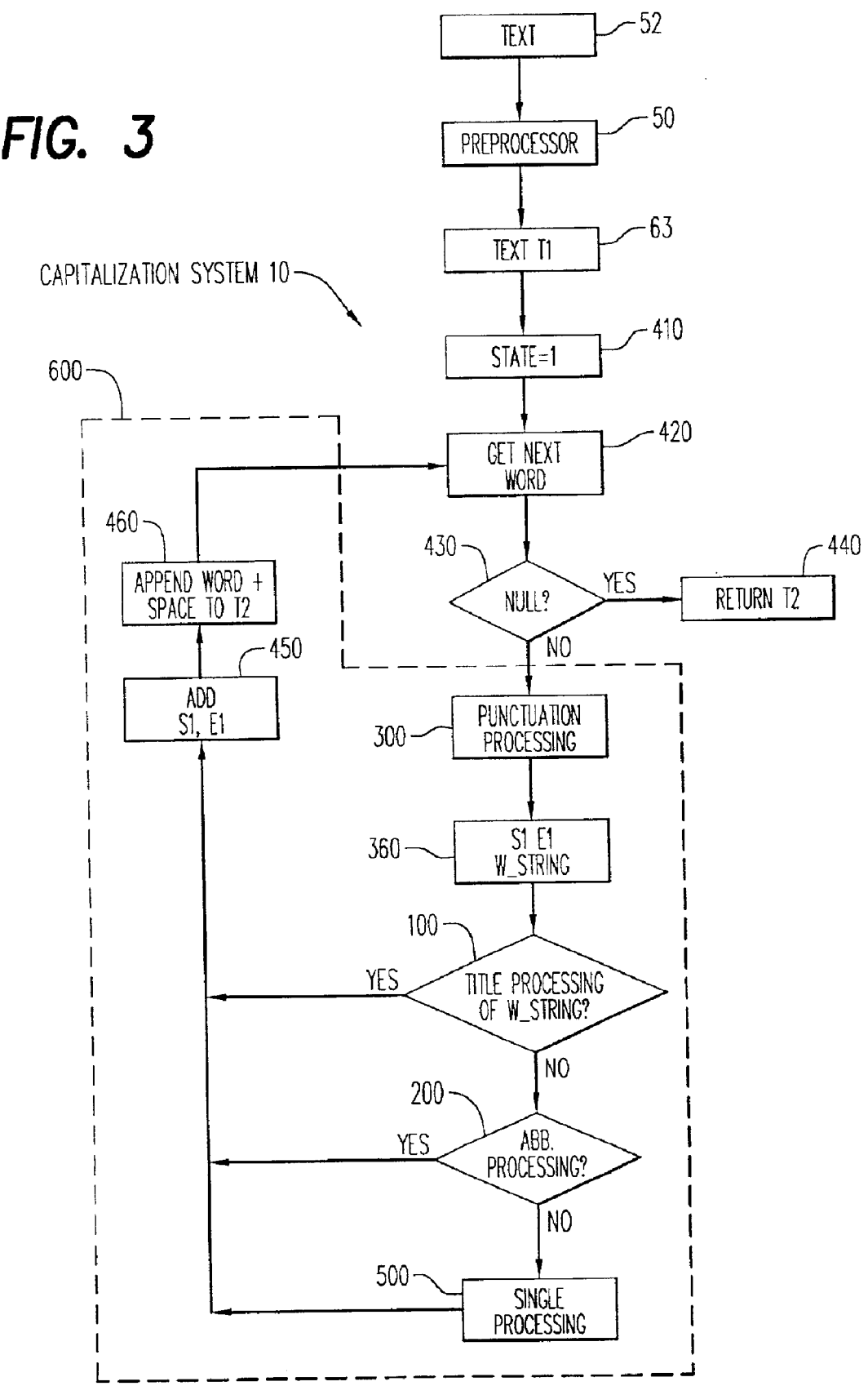
FIG. 3 is a logic flow diagram depicting the overall operation of the capitalization system of FIG. 1.
Figure 8:
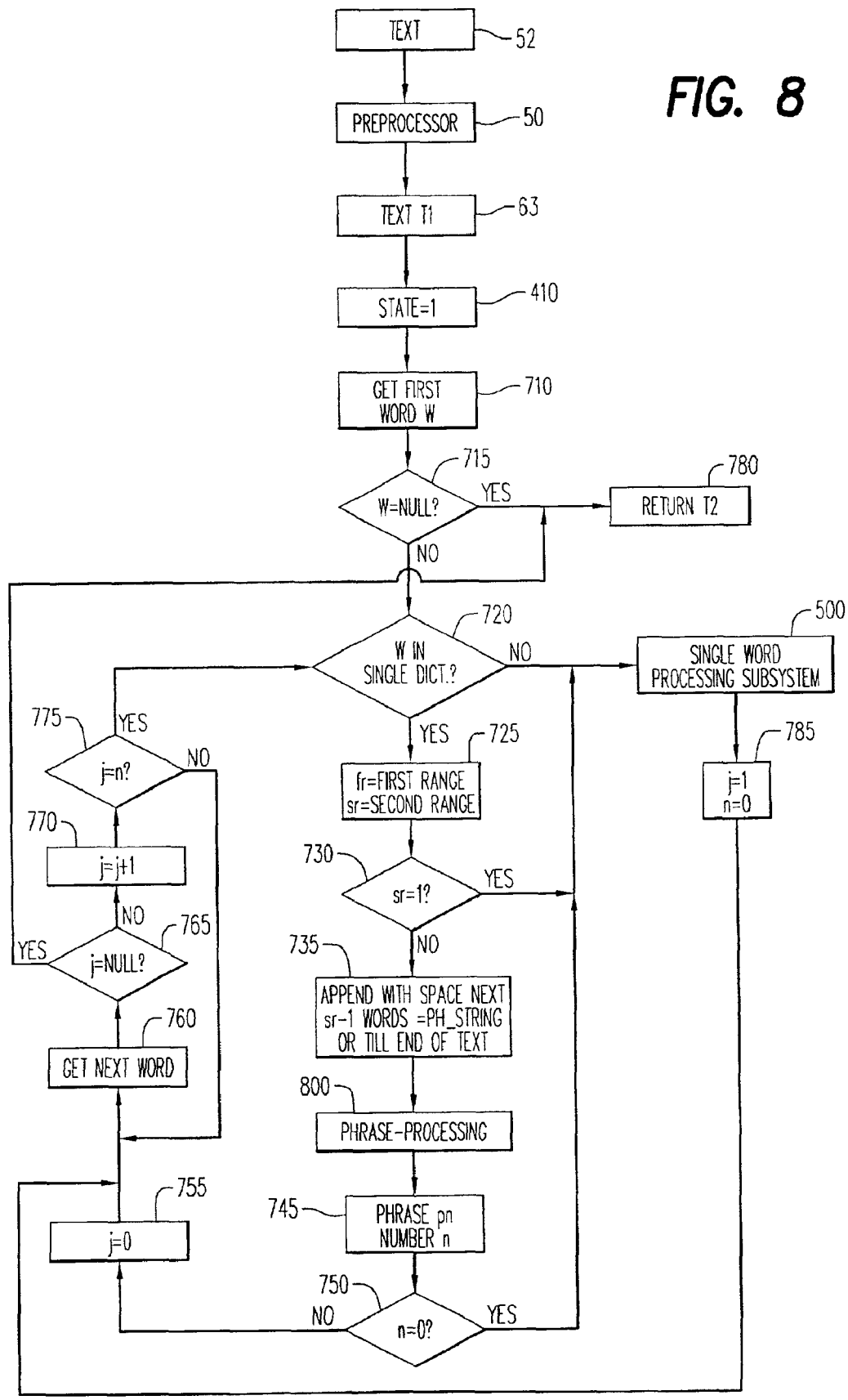
FIG. 8 is a logic flow diagram of the capitalization system with phrase processing.

The operation of the capitalization recovery system 10 (without phrase processing, which is shown in the separate flowchart of FIG. 8) is depicted in the flowchart of FIG. 3.

The input to the capitalization recovery system 10 is the text depicted in box 52 of FIG. 2, and the input to the remainder of the capitalization recovery system 10 is the processed text T1 from box 63 that is output from the preprocessor 50. In box 410 the state of the finite state machine is set to 1. Box 420 depicts the beginning of the loop through all the words in the text. Each word is sent to the several subsystems introduced above and is modified (i.e. capitalized) if appropriate and then appended to a text string T2. When the last word is encountered, which is determined by a positive null test in box 430, the capitalization recovery system 10 returns the automatically capitalized text T2 in box 440. Otherwise, the word becomes the input to the punctuation processing in box 300. The output of the punctuation processing, shown in box 360, is three strings: S1, E1 and W_String. S1 and E1 can be empty and hold the potential punctuation at the beginning and the end of each word. The string W_String is the word with the non-essential punctuation stripped out and captured in the strings S1 and E1. The string W_String is examined to determine whether it is a title. Note that each of these subsystems return the same information:

1) The string W_String which may have been modified
2) The value of the state which may have been modified
3) A binary answer (yes/no)

If the title processing returns 'no', W_String is examined by the abbreviation processing subsystem in box 200. If the abbreviations subsystem 200 returns 'no', the same string is examined in box 500 by the single word subsystem which then continues to box 450. Box 450 is immediately reached when either the title processing or the abbreviation processing subsystems return 'yes'. In box 450, the string S1 is prepended and the string E1 is appended to the string W_String to form the string W. This string W is then appended to the text T2 followed by a space. Then the next word of the original text T1 is retrieved in the box 420 and the loop continues. The dotted line box 600 denotes the single word processing subsystem.

Figure 6:
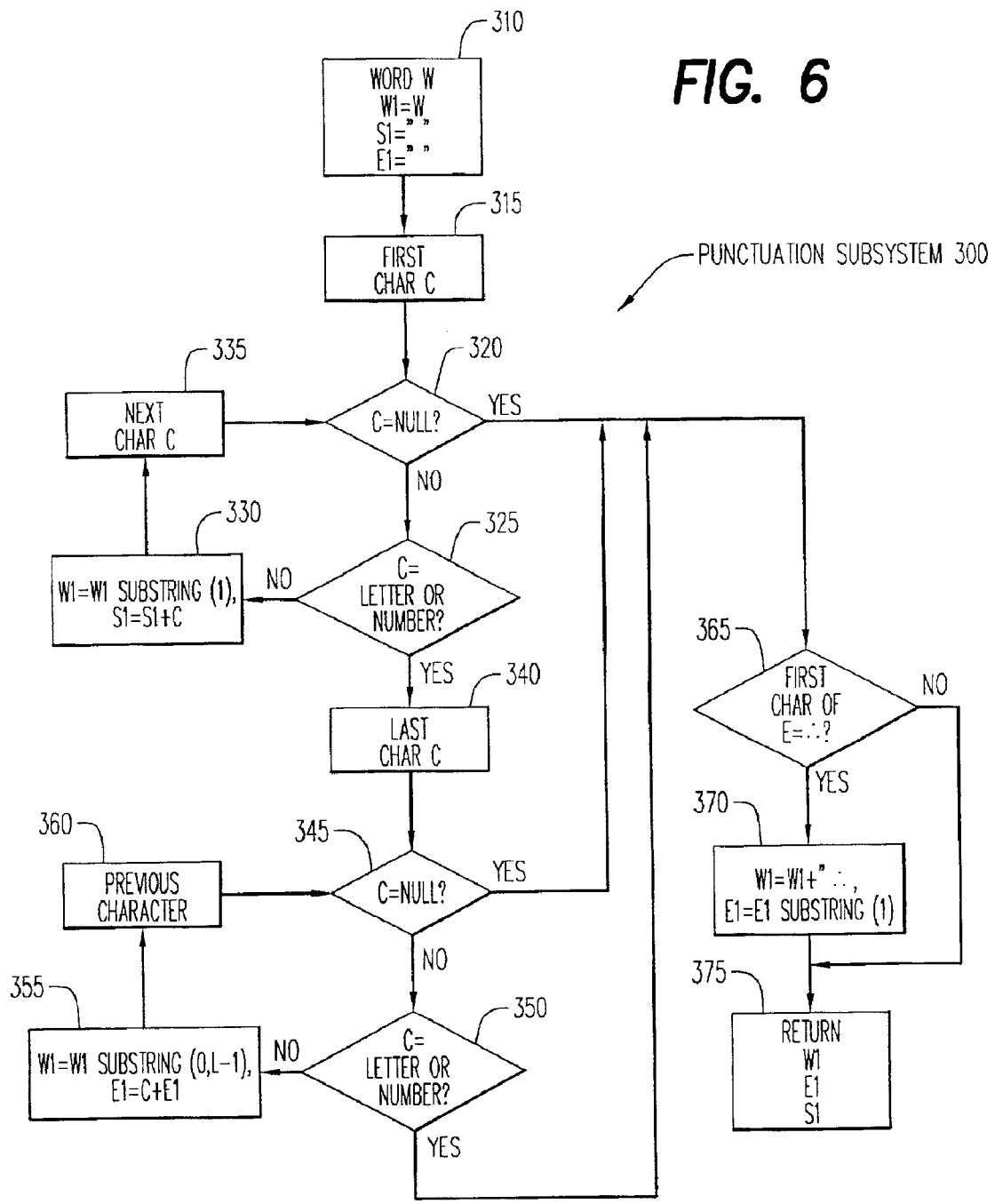
FIG. 6 is a logic flow diagram of the operation of the punctuation processing block of FIG. 3.

The first subsystem invoked is the punctuation processing subsystem 300, as shown in FIG. 6. The input is shown in box 310 as the word w. Some other variables are also initialized in this box, including strings W1, S1 and E1. It should be noted at this point that the use of strings is one preferred embodiment, and that other representations could be employed as well.

The string W1 is initialized to be identical to the string W, whereas S1 and E1 are empty strings. In box 345 the first character C of W is determined. In box 320 it is tested whether C is null, indicating that the end of the string was reached, in which case the capitalization recovery system 10 continues to box 365.

Otherwise, it is checked in box 325 whether it is a letter or number (for English or other characters in different languages). If it is not a letter or a number, the capitalization recovery system 10 continues to box 330. There the first character of the string W1 is removed and the string W1 is now assigned this new value. The character C is appended to the string S1. In box 335 the next character of the word W is determined and the loop continues in box 320. On the other hand, if the character C is a letter or number (as tested in box 325), the capitalization recovery system 10 proceeds to box 340 where the last character C of the word W is determined. The character is tested in box 345 and if it is null, indicating that the end of the string was reached, it proceeds to box 365. Otherwise, C is tested for being either a letter or number in box 350. In the case that C is a letter or number the capitalization recovery system 10 proceeds to box 365. Otherwise, the last character of the string W1 is removed and W1 is set to this new value in box 355 and the character C is added to the beginning of string E1. In box 360 the previous character of the string W is determined before continuing in box 345. Different paths through the flowchart end in box 365 at which point there are three strings S1 and E1 containing punctuations and W1 the word itself However, a period maybe both a punctuation or a part of the word itself (as in abbreviations or titles). Hence, in box 365 it is checked whether the first character in E1 is a period. If that assertion is true, the period is appended in box 370 and removed from the beginning of E1. After box 370, or if the assertion concerning the period is false, the capitalization recovery system 10 continues in box 375 where the three strings W1, E1 and S1 are returned.

Figure 4:
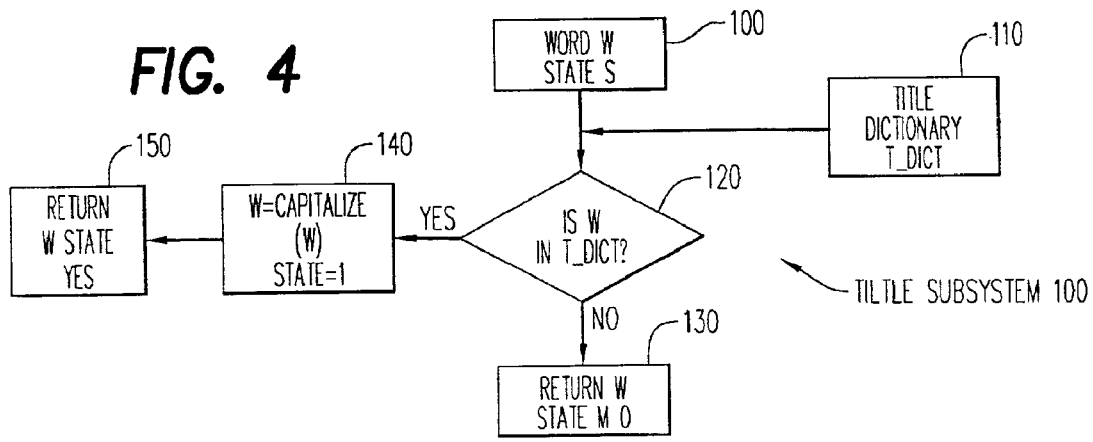
FIG. 4 is a logic flow diagram of the operation of the title processing block of FIG. 3.

FIG. 4 is flowchart that is descriptive of the title processing subsystem 100. The input to this subsystem is a word w and a state s which is shown in box 100. The other input is the title dictionary 15D, shown in box 110. One preferred embodiment of the title dictionary 15D is a text file, and the content of the title dictionary 15D is language dependent. For English, the title dictionary 1SD may contain Dr., Prof, Mr., Mrs., Gen. to mention a few. The title dictionary 15D is denoted as T_Dict. In box 120 it is tested whether the input word is a member of T_Dict. In the case where it is not, the title processing subsystem is done with its processing and continues to box 130 where the return values are prepared: the unchanged input word w and state s and the answer 'no'. On the other hand, if the word is a title, it is capitalized in box 140 (i.e., the first letter is capitalized) and the state is set to 1. In box 150 the return from the title processing subsystem is prepared: the capitalized word w, the state (value is now 1) and the answer 'yes'.

Figure 5:
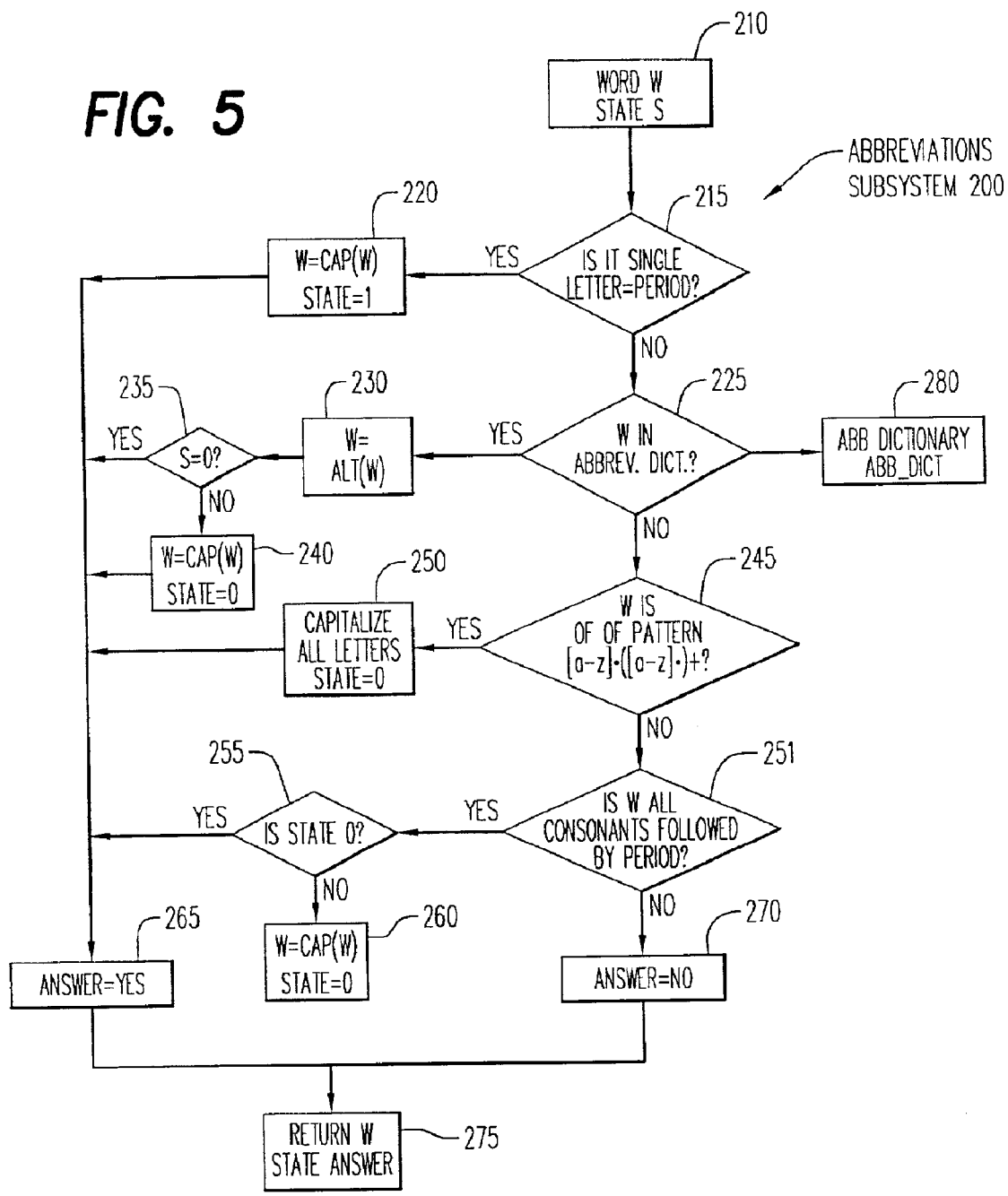
FIG. 5 is a logic flow diagram of the operation of the abbreviations processing block of FIG. 3.

FIG. 5 depicts the operation of the abbreviations processing subsystem 200. The input shown in box 210 is a word w and the current state of the capitalization recovery system 10. In box 215 it is tested whether w is a single letter followed by a period. If the test is positive, w is capitalized in box 220 and the state is set to 1 before proceeding to box 265 where the answer is set to 'yes'. Processing then continues to box 275 where the word, the state and the answer are returned from the abbreviations processing subsystem. In the case where the test in box 215 is negative, the word is looked up in the abbreviations dictionary 15E in box 225. The abbreviations dictionary 15E (ABB_Dict), shown in box 280, is in a preferred embodiment a text file and contains a set of abbreviations and, where appropriate, the preferred spelling for each abbreviation. For example, the preferred spelling for an abbreviation may be all letters being capitalized instead of only the first letter. In the case where the word w is found in the abbreviation dictionary 15E, the capitalization recovery system 10 continues in box 230 where the preferred spelling of the abbreviation is determined. In box 235 it is checked whether the current state is 0, in which case the capitalization recovery system 10 continues to box 265. Otherwise, the word is be capitalized (i.e., the first letter is capitalized) and the state is set to 0 in box 240 before continuing to box 265. If the word is not in the abbreviations dictionary 15E, it is checked whether it has a certain pattern. The pattern described here in box 245 is for English, however other patterns for either English or other languages could be employed. The pattern tested here is of the form: letter followed by a period which is repeated at least twice. If it is of that form, all letters of the word are capitalized in box 250 and the state is set to 0 before continuing to box 265. If the word does not satisfy the first mentioned pattern in box 245, it is checked for a different pattern in box 251. In this case a determination is made as to whether the word consists only of consonants followed by a period. If this is true, the state is examined in box 255, and if the state is 0 the capitalization recovery system 10 proceeds to box 265, otherwise processing continues at box 260 where the word is capitalized and the state is set to 0 before going to box 265. If the answer is negative in box 251, the answer is set to 'no' in box 270, and the word and the state are identical to the input. The final answer is returned in box 275.

Figure 7:
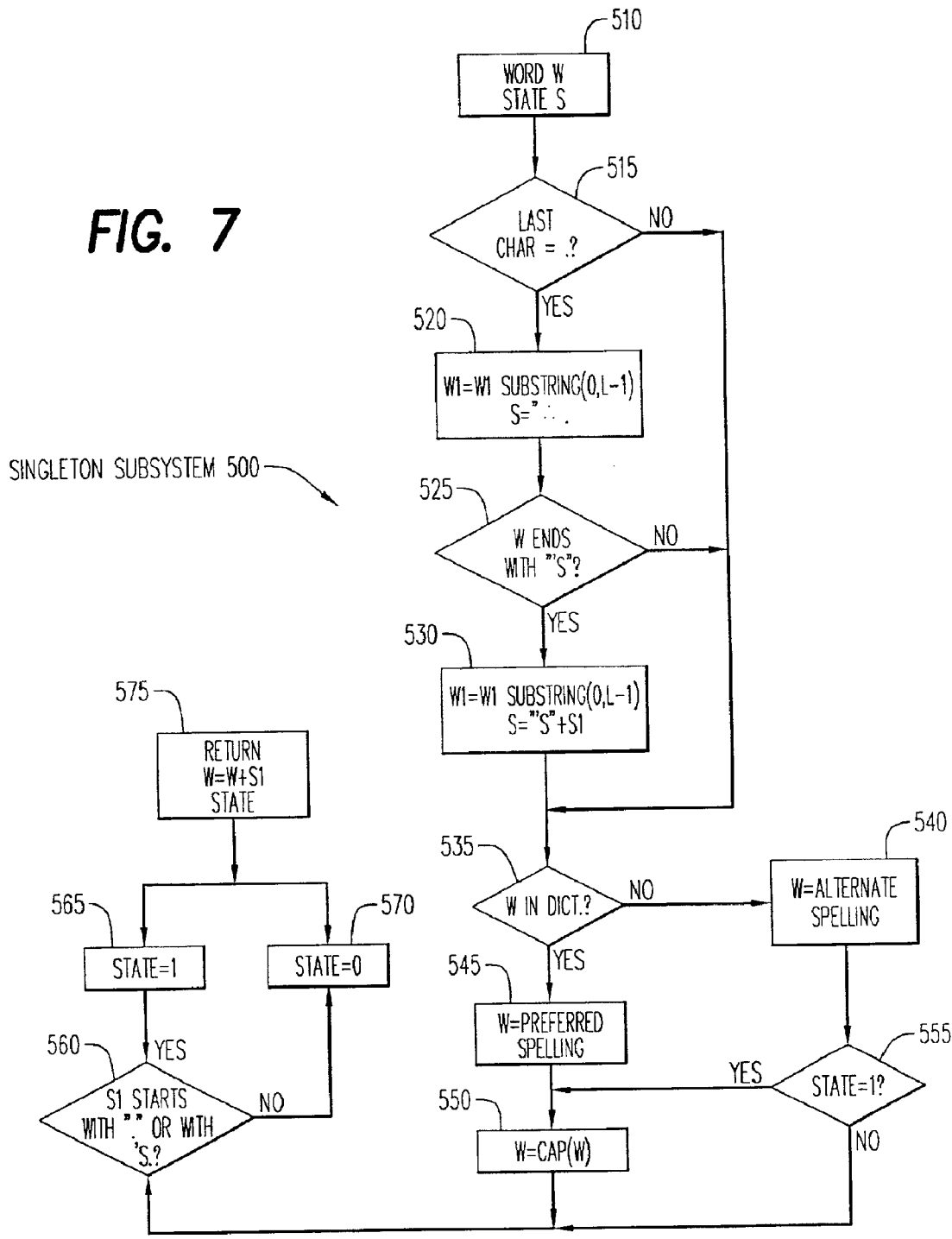
FIG. 7 is a logic flow diagram of the operation of the single word processing block of FIG. 3.

The next subsystem to be described is the single word processing subsystem 100 shown in FIG. 7. The input is a word w and the current state of the capitalization recovery system 10. The conventions are as follows: when state is equal to 1, the next word is capitalized, and a capitalized word has its first letter capitalized, and the rest of the characters can be either lower or upper case. In box 515 it is checked whether the last character is a period. If 'yes', the period is removed from the word and S1 is set to the period in box 520. Otherwise the capitalization recovery system 10 proceeds to box 535. In box 525 it is checked whether the word ends with the string "'s" (apostrophe s), in which case these two characters are removed from the word in box 530 and prepended to string S1 in box 530. It should be noted that testing the word for "." and "'s" are English language-specific, and for other languages a different end of sentence punctuation mark could be substituted for the ".", and a different string than "'s" could be substituted if appropriate. In box 535 it is checked whether the word w is in the singles dictionary 15A. The singles dictionary 15A contains the words which should be capitalized in the text and, if the capitalization is different than only capitalizing the first letter, a preferred spelling is included. If the word w is in the singles dictionary 1SA its preferred spelling is looked up in box 545. Otherwise the capitalization recovery system 10 continues to box 540 for (language dependent) algorithms for capitalization. For English, the following two algorithms are appropriate, but not exclusive: 1) if the word begins with "mc", the first letter and the character following the mc are capitalized; and 2) if the word is hyphenated, each word by itself is looked up in the singles dictionary 15A and the same rules as just described apply to each of the words separately before recombining them with a hyphen. In box 555 the state is examined and if it is 1 the method continues to box 550 where the word is capitalized. Recall that a word is also capitalized when it is in the singles dictionary 15A and, hence, after box 545. If the state is 0, or after the word has been capitalized, the capitalization recovery system 10 proceeds to box 560 where the start of the string S1 is checked. If it starts with a period or with the string "'s.", the capitalization recovery system 10 proceeds to box 565 where the state is set to 1, otherwise processing proceeds to box 570 where the state is set to 0. After the state has been set correctly, the capitalization recovery system 10 continues to box 575 where the string S1 is appended to word W before returning word W and the current state.

FIG. 8 is a logic flow diagram that extends the foregoing method so as to include phrase processing. The method of FIG. 8 shares components with the capitalization system described above. In the same fashion, the input text is shown in box 52. The preprocessor 50 adjusts the space between words as previously described to produce the adjusted text T1 shown in box 63. The state of the system is initialized to 1 in box 410. The first word is obtained in box 710 and it is tested for being null (indicating that the end of the input text was reached) in box 715. At the end of the input text, the properly capitalized text is returned in box 780. Otherwise, it is checked whether the word W is in the singleton dictionary 15A in box 720. In one preferred embodiment, the singleton dictionary 15A is structured as shown in FIG. 10. As was mentioned previously, there are several items of information associated with each word 1020 in the singleton dictionary 15A. More specifically, there are two numbers denoting the minimum number (first range) of words of a phrase which starts with the word w (field 1030) and the maximum number (second range) of words in a phrase starting with this word (field 1040). Furthermore, a preferred spelling (1050), if it exists, is also associated with the word. If the word W is not found in the singleton dictionary 15A it is sent to the single word processing subsystem which has been previously described in reference to FIG. 7. However, if the word is in the singleton dictionary 15A, the system proceeds to box 725. There, the first range (1030) and the second range (1040) for the word are retrieved. In Box 730 it is tested whether the second range 1040 is 1, which would indicate that the word is not the beginning of a phrase. In that case the processing of the capitalization recovery system 10 proceeds to box 600. If the second range 1040 is greater than 1, N, the next N−1 words are retrieved from the text in box 735 and a phrase string is assembled by concatenating the n words with spaces in between. This phrase string becomes the input to the phrase processing subsystem which is described in greater detail in FIG. 9. The output of the phrase processing subsystem is a phrase string and a number n. The number n indicates how many words were used to assemble a properly capitalized phrase, and the phrase string contains the capitalized string of words. In case the number n is 0, indicating that no appropriate phrase was found, the system continues with box 600, the single word processing subsystem shown in FIG. 500. Otherwise a counter j is initialized to 0 in box 755 and the next word obtained in box 760. This word is tested in box 765. If it is null the phrase processing is completed and the final text returned in box 780. Otherwise, the counter j is incremented by 1 in box 770. In box 775 the counter is tested against the size N of the found phrase. If these numbers are equal, the system continues in box 720, otherwise it obtains the next word in box 760. After a word is processed by the single word processing subsystem in box 600, it continues to box 785 where the counter is initialized to 1 before getting the next character in box 760.

Figure 9:
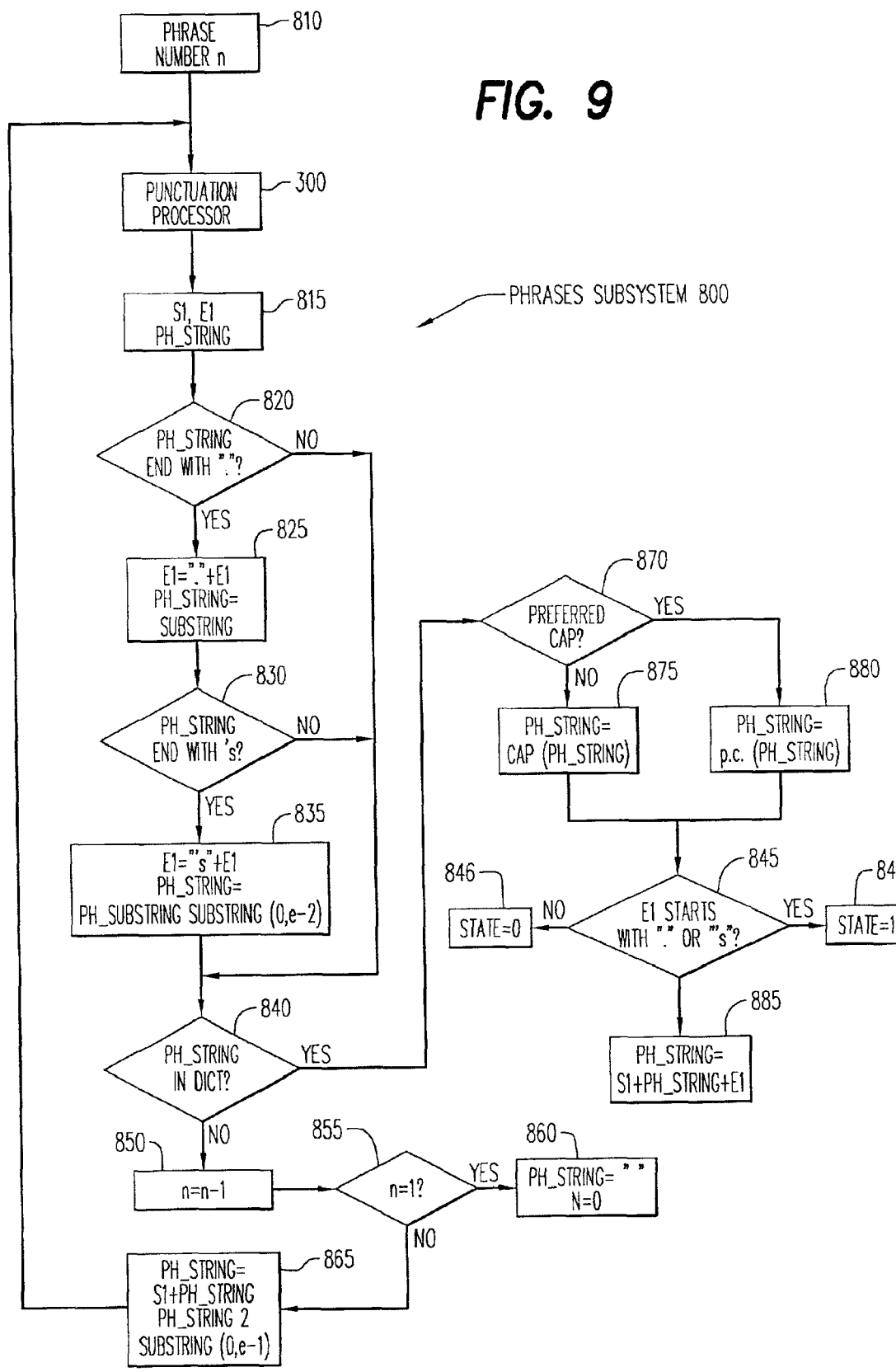
FIG. 9 is a logic flow diagram of a phrase processing subsystem.

The operation of the phrase processing subsystem 800 is illustrated in FIG. 9. The input is a phrase which is a set of words 810 and the number n which denotes the number of words in the phrase. In one preferred embodiment, a phrase is a string of characters and, as such, it is input to the punctuation processing subsystem 300 of FIG. 6. The punctuation processing subsystem 300 was previously described as taking a word as input, however, a phrase can be viewed for this purpose as a word with embedded spaces. The output of the punctuation processing subsystem 300 is shown in box 815, and contains strings S1 and E1 (the punctuation at the beginning and at the end of the phrase) and the remaining phrase (PH_String). In box 820 the output is tested as to whether the string ends with a period, in which case a period is prepended to the string E1 and the period is removed from PH_String. In box 830 a test is made as to whether the ending string "'s" (apostrophe s) is present, in which case the string is prepended to E1 and the string "'s" is removed from PH_String. In the next box 840 a test is made as to whether PH_String is in the phrase dictionary 15B. In one preferred embodiment, the phrase dictionary 15B is structured as shown in FIG. 11. The fields 1110 of the phrase dictionary 15B include fields holding phrases 1120 and corresponding fields 1130 holding the preferred spelling, and hence the preferred capitalization for the phrases (if it differs from the standard capitalization where each word in the phrase is capitalized). If PH_String is found in the phrase dictionary 15B, the method executed by the capitalization recovery system 10 proceeds to box 870 where a check is made as to whether there is a preferred capitalization of PH_String (as indicated in the field 1130). In case there is, PH_String is set to this preferred capitalization in box 880. Otherwise, each word of PH_String is capitalized in box 875. Next, in box 845 it is checked whether E1 starts with "." or "'s" (apostrophe s) in which case the capitalization recovery system 10 proceeds to box 847 to set the state to 1. Otherwise processing continues at box 846 to set the state to 0. The string S1 is prepended to PH_String in box 885, while E1 is appended. The phrase string PH_String, the number n and the state are returned.

If the phrase string is not found in the phrase dictionary 15B in box 840, the number n is decreased by 1 in box 850. In box 855 it is tested whether this number is 1, in which case the phrase string is set to be an empty string and n is set to 0 before returning. On the other hand, if n is not 1, the processing of capitalization recovery system 10 continues in box 865 where S1 is prepended to PH_String and the last word is removed before starting the loop again in box 300.

FIG. 10 shows the organization of the singleton dictionary 15A, discussed above. The singleton dictionary 15A contains one or more entries 1010, where each entry consists of a term string 1020 (the term in all lower case), the length of the shortest phrase that the term heads 1030, the length of the longest phrase that the term heads 1040, and the optional preferred spelling 1050 for the term, if the capitalized form of the term is other than the default (first letter uppercase, rest lowercase). If the term does not head a phrase, then fields 1030 and 1040 are one. The singleton dictionary 15A may be loaded into a hash table or other suitable data structure for rapid lookup of terms.

FIG. 11 shows the organization of the phrase dictionary 15B, also discussed above. The phrase dictionary 15B contains one or more entries 1110, where each entry includes the phrase string 1120 (the phrase in all lower case) and the optional preferred spelling 1130 for the phrase if the capitalized form of the phrase is other than the default (for each word in the phrase the first letter is uppercase and the reset are lowercase). The phrase dictionary 15B may also be loaded into a hash table or other suitable data structure for rapid lookup of phrases.

Figure 12:
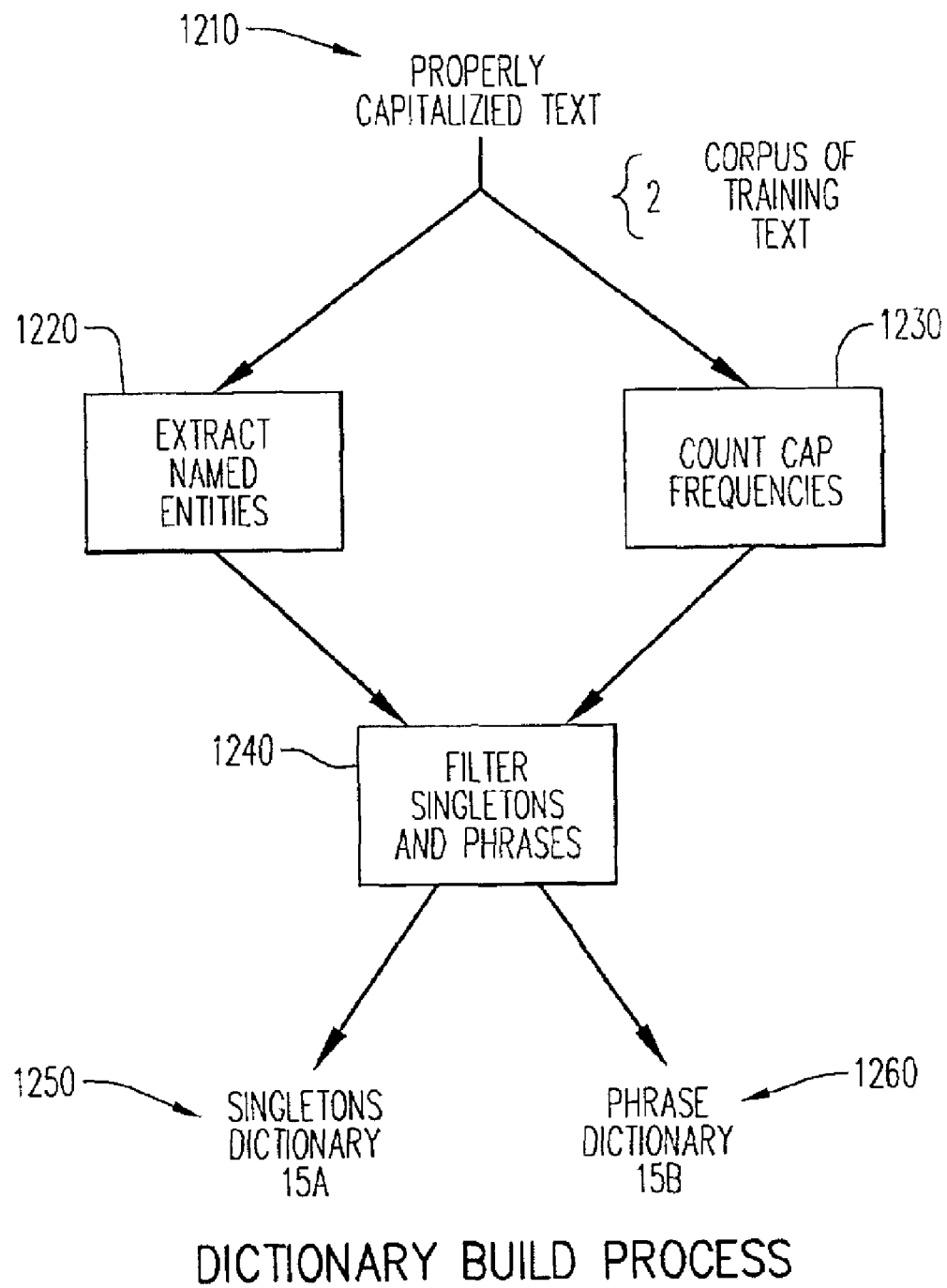
FIG. 12 is logic flow diagram that illustrates a preferred construction process for the singleton and phrase dictionaries of FIGS. 10 and 11.

FIG. 12 illustrates a method for constructing the singleton dictionary 15A and the phrase dictionary 15B. Properly capitalized training text 1210 is input to a dictionary build process and sent to two subprocesses. Subprocess 1220 runs, for example, a conventional Named Entity Extraction system on the text to extract named entities. Named entities include proper names, people, places and similar items, and each named entity may consist of one or more terms. In practice, almost every capitalized term or phrase that does not appear in a mandatory capitalization position (e.g., start of sentence) is a named entity. Subprocess 1230 counts the number of times each word in the training text 1210 occurs lowercased (l), capitalized (c), all uppercase (u), and in a mandatory capitalization position (m). These counts are then used to compute a capitalization probability p for each word using the above-mentioned formula:

$$(C_i) = (c_i - m_i + u_i)/(l_i + c_i + u_i).$$

In step 1240, the named entities extracted in step 1220 are filtered. All named entities that occur in fewer than, for example, three documents are discarded, and all single-term named entities with capitalization probability (from step 1230) less than, for example, 0.5 are discarded. These values may be varied as a function of the nature of the reference corpus, and based on other criteria. The named entities that survive this filtering are stored into the singleton dictionary 15A at step 1250 and into the phrase dictionary 15B at step 1260.

The inventors have thus described their capitalization recovery system 10 as applying a series of heuristic, statistical, and dictionary-based processing steps to recover capitalization. Experimental results have shown that the capitalization recovery system 10 is both effective and robust across a variety of text genres and training conditions. Optimum performance is found to be achieved when a suitable training corpus is available, but for most applications this is not overly burdensome, since properly capitalized text is usually readily available. Unlike other applications, such as named entity recognition or document classification, the training data does not require manual labeling.

In addition to the applications discussed above for the capitalization recovery system 10, another potential application of these teachings is local document analysis, where dictionaries and statistics are modified on a per document basis as each document is processed, allowing the system to account for the occurrence of named entities that alter capitalization probabilities for the common words in those named entities.

It is also contemplated that the operation of the capitalization recovery system 10 may be improved by the use of richer statistical models, such as Hidden Markov Models, that incorporate additional features (e.g., context) into the capitalization probability calculation.

Thus, while these teachings have been particularly shown and described with respect to preferred embodiments thereof, it will be understood by those skilled in the art that changes in form and details may be made therein without departing from the scope and spirit of these teachings.

What is claimed is:

1. A method for capitalizing text in a document comprising:
   processing a reference corpus to construct a plurality of dictionaries of capitalized terms, said plurality of dictionaries comprising a singleton dictionary and a phrase dictionary, where each record in the singleton dictionary comprises a word in lowercase, a range of phrase lengths m:n for capitalized phrases that the word begins, where m is a minimum phrase length and n is a maximum phrase length, and where each record in the phrase dictionary comprises a multi-word phrase in lowercase; and
   adding proper capitalization to an input monocase document by capitalizing words found in mandatory capitalization positions; and by
   looking up each word in the singleton dictionary and, if the word is found in the singleton dictionary, testing the corresponding phrase length range, where if the phrase length range indicates that the word does not start a multi-word phrase, capitalizing the word, while if the phrase length range indicates that the word does start a multi-word phrase, testing the word and an indicated plurality of next words as a candidate phrase to determine if the candidate phrase is found in the phrase dictionary and, if it is, capitalizing the words of the multi-word phrase, where if the candidate phrase is not found in the phrase dictionary, changing the number of words in the candidate phrase to form a revised candidate phrase and determining whether the revised candidate phrase is found in the phrase dictionary.

2. A method as in claim 1, wherein each record in said singleton dictionary further comprises an optional final form for the word if the word has unusual capitalization, and where each record in said phrase dictionary comprises an optional final form for the phrase if the phrase has unusual capitalization.

3. A method for capitalizing text in a document comprising:
   processing a reference corpus to construct a plurality of dictionaries of capitalized terms, said plurality of dictionaries comprising a singleton dictionary and a phrase dictionary, where each record in the singleton dictionary comprises a word in lowercase, a range of phrase lengths m:n for capitalized phrases that the word begins, where m is a minimum phrase length and n is a maximum phrase length, and where each record in the phrase dictionary comprises a multi-word phrase in lowercase; and
   adding proper capitalization to an input monocase document by capitalizing words found in mandatory capitalization positions; and by
   looking up each word in the singleton dictionary and, if the word is found in the singleton dictionary, testing the corresponding phrase length range, where if the phrase length range indicates that the word does not start a multi-word phrase, capitalizing the word, while if the phrase length range indicates that the word does start a multi-word phrase, testing the word and an indicated plurality of next words as a candidate phrase to determine if the candidate phrase is found in the phrase dictionary and, if it is, capitalizing the words of the multi-word phrase, wherein when constructing the singleton dictionary all single word entities are added to the singleton dictionary with a phrase length range of 1:1, indicating that the word does not begin any phrase and should be capitalized by itself, and when constructing the phrase dictionary a multi-word phrase is added to the phrase dictionary, and the first word of the multi-word phrase is added to the singleton dictionary with a phrase length range of n:n, where n is the number of words in the phrase.

4. A method as in claim 3, wherein if the first word of the multi-word phrase already exists in the singleton dictionary, the phrase length range entry for the word is updated in the singleton dictionary so that the length of the current multi-word phrase is included in the phrase length range.

5. A method for capitalizing text in a document comprising:
   processing a reference corpus to construct a plurality of dictionaries of capitalized terms, said plurality of dictionaries comprising a singleton dictionary and a phrase dictionary, where each record in the singleton dictionary comprises a word in lowercase, a range of phrase lengths m:n for capitalized phrases that the word begins, where m is a minimum phrase length and n is a maximum phrase length, and where each record in the phrase dictionary comprises a multi-word phrase in lowercase; and
   adding proper capitalization to an input monocase document by capitalizing words found in mandatory capitalization positions; and by
   looking up each word in the singleton dictionary and, if the word is found in the singleton dictionary, testing the corresponding phrase length range, where if the phrase length range indicates that the word does not start a multi-word phrase, capitalizing the word, while if the phrase length range indicates that the word does start a multi-word phrase, testing the word and an indicated plurality of next words as a candidate phrase to determine if the candidate phrase is found in the phrase dictionary and, if it is, capitalizing the words of the multi-word phrase,
   wherein capitalizing words found in mandatory capitalization positions capitalizes words that begin sentences, words found in an abbreviations dictionary, and words found in a titles dictionary, and wherein said abbreviations dictionary is constructed such that all words that end with a period at least X % of the time, and that precede a lower case word at least Y % of those times, are added to the abbreviations dictionary, and all words from the singleton dictionary that end with a period are added to the abbreviations dictionary.

6. A method as in claim 5, wherein X is 75 and Y is 50.

7. A method for capitalizing text in a document comprising:
   processing a reference corpus to construct a plurality of dictionaries of capitalized terms, said plurality of dictionaries comprising a singleton dictionary and a phrase dictionary, where each record in the singleton dictionary comprises a word in lowercase, a range of phrase lengths m:n for capitalized phrases that the word begins, where m is a minimum phrase length and n is a maximum phrase length, and where each record in the phrase dictionary comprises a multi-word phrase in lowercase; and adding proper capitalization to an input monocase document by capitalizing words found in mandatory capitalization positions; and by looking up each word in the singleton dictionary and, if the word is found in the singleton dictionary, testing the corresponding phrase length range, where if the phrase length range indicates that the word does not start a multi-word phrase, capitalizing the word, while if the phrase length range indicates that the word does start a multi-word phrase, testing the word and an indicated plurality of next words as a candidate phrase to determine if the candidate phrase is found in the phrase dictionary and, if it is, capitalizing the words of the multi-word phrase wherein processing the reference corpus comprises:

counting a number of times each word in the reference corpus occurs lowercased (l), capitalized (c), all uppercase (u) and in a mandatory capitalization position (m); and computing a capitalization probability p for each word in the reference corpus in accordance with:

$$p(C_i)=(c_i-m_i+u_i)/(l_i+c_i-m_i+u_i).$$

8. A method as in claim 7, and further comprising filtering named entities extracted from the reference corpus such that named entities that occur in fewer than Z documents are discarded, and all single-word named entities having a computed capitalization probability less than W are discarded; and storing surviving named entities into at least one of said plurality of dictionaries.

9. A method as in claim 8, wherein Z=3 and W=0.5.

10. A computer system for capitalizing text in a document, said computer system comprising a data processor that operates in accordance with program instructions recorded on an electronically readable program instruction storage media, said program instructions controlling said data processor for processing a reference corpus to construct a plurality of dictionaries of capitalized terms, said plurality of dictionaries comprising a singleton dictionary and a phrase dictionary, where each record in the singleton dictionary comprises a word in lowercase, a range of phrase lengths m:n for capitalized phrases that the word begins, where m is a minimum phrase length and n is a maximum phrase length, and where each record in the phrase dictionary comprises a multi-word phrase in lowercase; for adding proper capitalization to an input monocase document by capitalizing words found in mandatory capitalization positions; and for looking up each word in the singleton dictionary and, if the word is found in the singleton dictionary, for testing the corresponding phrase length range, where if the phrase length range indicates that the word does not start a multi-word phrase, capitalizing the word, while if the phrase length range indicates that the word does start a multi-word phrase, for testing the word and an indicated plurality of next words as a candidate phrase to determine if the candidate phrase is found in the phrase dictionary and, if it is, capitalizing the words of the multi-word phrase, where said program instructions further control said data processor so that, if the candidate phrase is not found in the phrase dictionary, for changing the number of words in the candidate phrase to form a revised candidate phrase and for determining whether the revised candidate phrase is found in the phrase dictionary.

11. A computer system as in claim 10, wherein each record in said singleton dictionary further comprises an optional final form for the word if the word has unusual capitalization, and where each record in said phrase dictionary comprises an optional final form for the phrase if the phrase has unusual capitalization.

12. A computer system for capitalizing text in a document, said computer system comprising a data processor that operates in accordance with program instructions recorded on an electronically readable program instruction storage media, said program instructions controlling said data processor for processing a reference corpus to construct a plurality of dictionaries of capitalized terms, said plurality of dictionaries comprising a singleton dictionary and a phrase dictionary, where each record in the singleton dictionary comprises a word in lowercase, a range of phrase lengths m:n for capitalized phrases that the word begins, where m is a minimum phrase length and n is a maximum phrase length, and where each record in the phrase dictionary comprises a multi-word phrase in lowercase; for adding proper capitalization to an input monocase document by capitalizing words found in mandatory capitalization positions; and for looking up each word in the singleton dictionary and, if the word is found in the singleton dictionary, for testing the corresponding phrase length range, where if the phrase length range indicates that the word does not start a multi-word phrase, capitalizing the word, while if the phrase length range indicates that the word does start a multi-word phrase, for testing the word and an indicated plurality of next words as a candidate phrase to determine if the candidate phrase is found in the phrase dictionary and, if it is, capitalizing the words of the multi-word phrase, where said program instructions further control said data processor, when constructing the singleton dictionary, such that all single word entities are added to the singleton dictionary with a phrase length range of 1:1, indicating that the word does not begin any phrase and should be capitalized by itself, and when constructing the phrase dictionary a multi-word phrase is added to the phrase dictionary, and the first word of the multi-word phrase is added to the singleton dictionary with a phrase length range of n:n, where n is the number of words in the phrase.

13. A computer system as in claim 12, where said program instructions further control said data processor, if the first word of the multi-word phrase already exists in the singleton dictionary, such that the phrase length range entry for the word is updated in the singleton dictionary so that the length of the current multi-word phrase is included in the phrase length range.

14. A computer system as in claim 10, where said program instructions further control said data processor, when capitalizing words found in mandatory capitalization positions, to capitalize words that begin sentences, words found in an abbreviations dictionary, and words found in a titles dictionary.

15. A computer system for capitalizing text in a document, said computer system comprising a data processor that operates in accordance with program instructions recorded on an electronically readable program instruction storage media, said program instructions controlling said data processor for processing a reference corpus to construct a plurality of dictionaries of capitalized terms, said plurality of dictionaries comprising a singleton dictionary and a phrase dictionary, where each record in the singleton dictionary comprises a word in lowercase, a range of phrase lengths m:n for capitalized phrases that the word begins, where m is a minimum phrase length and n is a maximum phrase length, and where each record in the phrase dictionary comprises a multi-word phrase in lowercase; for adding proper capitalization to an input monocase document by capitalizing words found in mandatory capitalization positions; and for looking up each word in the singleton dictionary and, if the word is found in the singleton dictionary, for testing the corresponding phrase length range, where if the phrase length range indicates that the word does not start a multi-word phrase, capitalizing the word, while if the phrase length range indicates that the word does start a multi-word phrase, for testing the word and an indicated plurality of next words as a candidate phrase to determine if the candidate phrase is found in the phrase dictionary and, if it is, capitalizing the words of the multi-word phrase, where said program instructions further control said data processor, when processing the reference corpus, for counting a number of times each word in the reference corpus occurs lowercased (l), capitalized (c), all uppercase (u) and in a mandatory capitalization position (m); and for computing a capitalization probability p for each word in the reference corpus in accordance with:

$$p(C_i)=(c_i-m_i+u_i)/(l_i+c_i-m_i+u_i).$$

16. A computer system as in claim 15, where said program instructions further control said data processor for filtering named entities extracted from the reference corpus such that named entities that occur in fewer than Z documents are discarded, and all single-word named entities having a computed capitalization probability less than W are discarded; and for storing surviving named entities into at least one of said plurality of dictionaries.

17. A computer system as in claim 16, wherein Z=3 and W=0.5.

\* \* \* \* \*